United States Patent
Arnott

(10) Patent No.: US 8,631,771 B2
(45) Date of Patent: Jan. 21, 2014

(54) COOLING SYSTEM FOR A VEHICLE SUBSYSTEM AND A VEHICLE INCORPORATING SUCH A SYSTEM

(75) Inventor: Keiron John Arnott, Shipley (GB)

(73) Assignee: DENSO Marston, Ltd., West Yorkshire (GB)

( * ) Notice: Subject to any disclaimer, the term of this patent is extended or adjusted under 35 U.S.C. 154(b) by 1141 days.

(21) Appl. No.: 12/552,560

(22) Filed: Sep. 2, 2009

(65) Prior Publication Data

US 2010/0058999 A1    Mar. 11, 2010

(30) Foreign Application Priority Data

Sep. 9, 2008    (GB) .................................... 0816490.7

(51) Int. Cl.
*F01P 1/06*    (2006.01)
(52) U.S. Cl.
USPC .................................. 123/41.31; 123/196 AB
(58) Field of Classification Search
USPC ................. 123/41.29, 41.31, 41.33, 196 AB; 165/DIG. 104, DIG. 126, DIG. 129
See application file for complete search history.

(56) References Cited

U.S. PATENT DOCUMENTS

| | | | | |
|---|---|---|---|---|
| 5,215,044 A | * | 6/1993 | Banzhaf et al. | 123/41.29 |
| 5,501,184 A | * | 3/1996 | Engelen et al. | 123/41.29 |
| 6,772,715 B2 | * | 8/2004 | Pfeffinger et al. | 123/41.31 |
| 7,261,068 B1 | * | 8/2007 | Wantschik | 123/41.29 |
| 7,607,958 B1 | * | 10/2009 | Hochmayr et al. | 440/75 |
| 2007/0186878 A1 | | 8/2007 | Wantschik | |

FOREIGN PATENT DOCUMENTS

| | | |
|---|---|---|
| EP | 1657416 | 5/2006 |
| WO | 2007050550 | 5/2007 |

OTHER PUBLICATIONS

Search Report dated Feb. 20, 2009 in corresponding Great Britain application No. 0816490.7.

* cited by examiner

*Primary Examiner* — Hung Q Nguyen

(74) *Attorney, Agent, or Firm* — Harness, Dickey & Pierce, PLC

(57) ABSTRACT

In a system for cooling transmission oil in a vehicle with a hydraulic oil cooling circuit 20, an engine cooling subsystem 18 which uses cooling fluid, and a transmission oil cooling circuit 22, the transmission oil circuit 22 comprises first and second heat exchangers 28, 38. The first heat exchanger 28 is provided with cooling fluid from the engine cooling subsystem 18 to cool the transmission oil and the second heat exchanger 38 is provided with oil from the hydraulic oil cooling circuit 20 to cool the transmission oil.

31 Claims, 2 Drawing Sheets

COOLING SYSTEM FOR A VEHICLE SUBSYSTEM AND A VEHICLE INCORPORATING SUCH A SYSTEM

CROSS-REFERENCE TO RELATED APPLICATIONS

This application claims the benefit and priority of GB 0816490.7, filed Sep. 9, 2008. The entire disclosure of the above application is incorporated herein by reference.

FIELD

The present disclosure relates to a cooling system for a vehicle subsystem, and a vehicle incorporating such a system. More particularly, but not exclusively, the present disclosure relates to a cooling system for a vehicle transmission system.

BACKGROUND

This section provides background information related to the present disclosure which is not necessarily prior art.

In conventional vehicle heat exchange systems, hot fluid is cooled using a single heat exchanger which may be air cooled or liquid cooled. Liquid cooled heat exchangers have the benefit of being more flexible to package as they do not need to be positioned in the cooling air stream at the front of the vehicle. In engines cooled using water/glycol, once the water/glycol has been cooled by the radiator, it may be used in a liquid-liquid heat exchanger to cool the oil in the transmission system. However, the temperature of the water/glycol discharged from a conventional radiator approaches that of the transmission oil, and this thus leads to low cooling efficiency. In some applications, the amount of cooling required for the transmission circuit may cause the radiator to overheat. A low temperature circuit may be used to cool the water/glycol to a lower temperature, but this requires either an additional radiator or a complex radiator cooling both the low temperature and main cooling circuits, and thus this is an expensive and complex solution.

US 2006/0254538 shows a cooling circuit of an internal combustion engine of a motor vehicle, comprising a main cooling circuit with a main radiator, and a low-temperature circuit encompassing a low-temperature radiator. This is more complex than the known system as an additional radiator is required.

The present disclosure seeks to overcome, or at least mitigate, the problems of the prior art.

SUMMARY

This section provides a general summary of the disclosure, and is not a comprehensive disclosure of its full scope or all of its features.

According to a first aspect of the present disclosure, there is provided a cooling system for a vehicle with a first cooling subsystem, an engine cooling subsystem which uses cooling fluid, and a second cooling subsystem, the first and second cooling subsystems including first subsystem fluid and second subsystem fluid, respectively, wherein the first vehicle subsystem includes first and second heat exchangers, the first heat exchanger being configured to allow the through-flow of cooling liquid from the engine cooling subsystem to cool the first subsystem fluid and the second heat exchanger being configured to allow the through-flow of the second fluid from the second subsystem to cool the first fluid.

Therefore, in vehicles which have two subsystems, apart from the engine cooling subsystem, the first subsystem fluid can be cooled by the second subsystem fluid, as well as the engine cooling fluid, thus preventing putting excessive heat into the engine cooling system, which may result in overheating, or removing the need for a complex and expensive low temperature radiator circuit. As the first subsystem is cooled using liquid-liquid heat exchangers, the heat exchangers can be located at the most convenient position within the engine bay.

The first cooling subsystem may be any suitable system and may be a transmission oil cooling circuit, the first fluid being transmission oil. The second cooling subsystem may be any suitable system and may be a hydraulic oil cooling circuit, the second fluid being hydraulic oil.

The second subsystem may include an air-liquid heat exchanger.

Preferably the cooling fluid in the engine cooling subsystem is a water/glycol mixture.

Preferably the first heat exchanger is a parallel flow cooler, and preferably the second heat exchanger is a parallel flow cooler.

It is not necessary for all the water/glycol mixture to pass through the first heat exchanger or all the second fluid to pass through the second heat exchanger in order to carry out the required degree of cooling of the first fluid. Therefore, by requiring only the minimum amount of water/glycol and second fluid to pass through first and second heat exchangers, respectively, the system operates as efficiently as possible. Preferably the engine cooling subsystem is configured such that not more than 10% of the total flow of engine cooling fluid in the engine cooling subsystem passes through the first heat exchanger. The engine cooling subsystem may comprise a first flow control device to control the proportion of the total flow of cooling fluid in the engine cooling subsystem which flows through the first heat exchanger, preferably to control the flow between 0% to 10% of the total flow of cooling fluid in the engine cooling subsystem.

Preferably the second subsystem is configured such that not more than 10% of the total flow of second subsystem fluid in the second subsystem passes through the second heat exchanger. The second cooling subsystem may comprise a second flow control device to control the proportion of the total flow of second fluid in the second cooling subsystem which flows through the second heat exchanger, preferably to control the flow between 0% to 10% of the total flow of second subsystem fluid in the second cooling subsystem.

The first and second heat exchangers may be connected in series.

The system may be self-regulating, so that when the temperature of the cooling fluid in the engine cooling system increases, the second subsystem fluid automatically cools the first fluid to a greater degree.

The first cooling subsystem may include a thermostat.

Preferably, when the temperature measured by the thermostat is less than a threshold temperature, the second flow control device prevents the flow of the second fluid through the second heat exchanger. Preferably, when the temperature measured by the thermostat exceeds the threshold temperature, the second flow control device controls the flow of second fluid such that the total flow of second fluid through the second heat exchanger is greater than 0% of the total flow in the second subsystem. Preferably, the second flow control device controls the flow of the second fluid such that the flow of second fluid through the second heat exchanger increases as the temperature measured by the thermostat increases, once the threshold temperature has been exceeded.

Alternatively, when the temperature measured by the thermostat is less than a threshold temperature, the first control device may prevent the flow of cooling fluid through the first heat exchanger. When the temperature measured by the thermostat exceeds the threshold temperature, the first flow control device may control the flow of cooling fluid such that the total flow of cooling fluid through the first heat exchanger is greater than 0% of the total flow in the engine cooling subsystem. The first flow control device may control the flow of cooling fluid such that the flow of cooling fluid through the first heat exchanger increases as the temperature measured by the thermostat increases, once the threshold temperature has been exceeded.

The first and second heat exchangers may be connected in parallel.

Preferably, the first cooling system includes a third flow control device to control the proportion of fluid which flows to the first and second heat exchangers. Preferably, when the temperature measured by the thermostat is less than a threshold temperature, the third flow control device prevents the flow of first fluid through the second heat exchanger. Preferably, when the temperature measured by the thermostat exceeds the threshold temperature, the third flow control device controls the flow of first fluid such that the total flow of first fluid through the second heat exchanger is greater than 0% of the total flow in the first subsystem. Preferably, the third flow control device controls the flow of the first fluid such that the flow of first fluid through the second heat exchanger increases until the temperature measured by the thermostat is less than the threshold temperature.

When the temperature measured by the thermostat is less than a threshold temperature, the third control device may prevent the flow of first fluid through the first heat exchanger. When the temperature measured by the thermostat exceeds the threshold temperature, the third flow control device may control the flow of first fluid such that the total flow of first fluid through the first heat exchanger is greater than 0% of the total flow in the first subsystem. The third flow control device may control the flow of first fluid such that the flow of first fluid through the first heat exchanger increases until the temperature measured by the thermostat is less than the threshold temperature.

According to a second aspect of the present disclosure, there is provided a system for cooling transmission oil in a vehicle with a hydraulic oil cooling circuit, an engine cooling subsystem which uses cooling fluid, and a transmission oil cooling circuit, wherein the transmission oil circuit comprises first and second heat exchangers, the first heat exchanger being provided with cooling fluid from the engine cooling subsystem to cool the transmission oil and the second heat exchanger being provided with oil from the hydraulic oil cooling circuit to cool the transmission oil.

According to a third aspect of the disclosure, there is provided a cooling system for a vehicle including an engine using transmission oil and a hydraulically operated implement, the system comprising a transmission oil circuit for the engine and a hydraulic circuit for the implement, and a heat exchanger acting between the hydraulic circuit and the transmission oil circuit so that the hydraulic fluid in the hydraulic circuit is arranged to cool the transmission oil in the transmission oil circuit.

According to a fourth aspect of the present disclosure, there is provided a vehicle incorporating a system according to any of the previous aspects of the disclosure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Two embodiments of the system of the present disclosure will now be described by way of example and with reference to the accompanying drawings, in which.

Corresponding reference numerals indicate corresponding parts throughout the several views of the drawings.

DETAILED DESCRIPTION

Example embodiments will now be described more fully with reference to the accompanying drawings.

Embodiment 1

Figure 1:
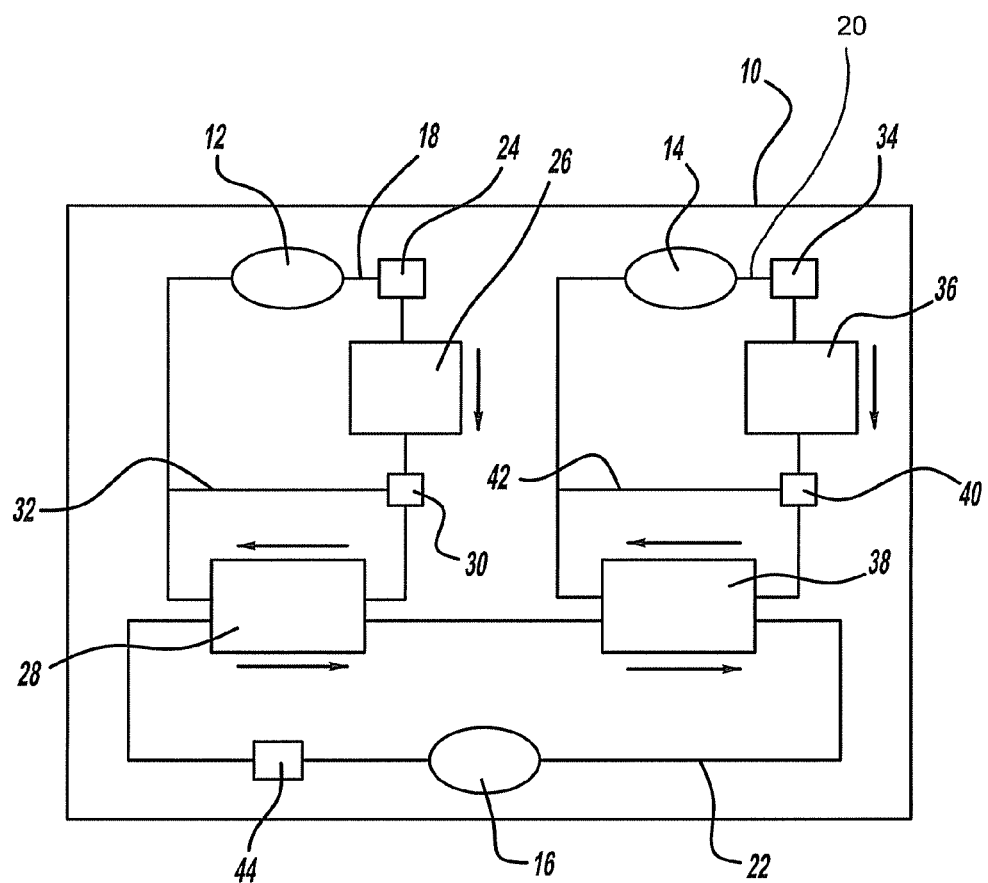
FIG. 1 is a schematic diagram of the first embodiment.

With reference to FIG. 1, a vehicle, which in this embodiment is an excavator, 10 comprises an engine 12, a hydraulic rams 14, for example, to operate a backhoe, and a transmission 16.

The engine 12 has an associated engine cooling subsystem 18, the hydraulic rams 14 have an associated hydraulic oil cooling subsystem 20, and the transmission 16 has an associated transmission oil cooling subsystem 22.

The engine 12 is cooled with a water/glycol mixture. The engine cooling subsystem 18 includes a pump 24 which pumps the water/glycol mixture, through an air-cooled radiator 26, with an associated fan (not shown), and a first heat exchanger 28, which is a parallel flow type heat exchanger, all of which are connected by appropriate pipework. The engine cooling subsystem 18 further includes a first flow control device 30, such as a valve or restriction, which enables the flow to the first heat exchanger 28 to be controlled, so that, in this embodiment, only 5% of the total flow of water/glycol flows through the first heat exchanger 28, the remainder following a bypass path 32.

The hydraulic oil cooling subsystem 20 includes a pump 34, which pumps the hydraulic oil from the hydraulic rams 14 through a hydraulic oil cooler 36, with an associated fan (not shown) and a second heat exchanger 38, which is a parallel flow type heat exchanger, all of which are connected by appropriate pipework. The hydraulic oil cooling subsystem 20 further includes a second flow control device 40, which enables the flow to the second heat exchanger 38 to be controlled, so that, in this embodiment, only 5% of the total flow of hydraulic oil flows through the second heat exchanger 38, the remainder following a bypass path 42.

The transmission oil cooling subsystem 22 is linked by appropriate pipework to the first and second heat exchangers 28, 38, so that transmission oil from the transmission oil subsystem 22 flows through the first and second heat exchangers 28, 38.

The transmission cooling subsystem includes a pump 44 and, in use, the transmission oil is pumped through the first heat exchanger 28 and then the second heat exchanger 38 in series. The water/glycol mixture and the hydraulic oil, having already been cooled, are at a lower temperature than the transmission oil, and so the transmission oil is cooled by passing through the first and second heat exchangers 28, 38. The system is self-regulating, and the second heat exchanger 38 effectively acts as a back-up cooler, so that, when the temperature of the water/glycol is higher, and so the first heat exchanger 28 is less effective at cooling the transmission oil, the second heat exchanger 38 will carry out a greater proportion of the cooling to be carried out on the transmission oil. This system has the advantage that the hydraulic rams 14 are unlikely to be used extensively whilst the transmission 16 of the excavator 10 is also being used, whereas it is likely the engine 12 will be used at the same time as the transmission 16. Therefore, the hydraulic oil, unlike the engine cooling fluid, is much more likely to be relatively cooler when the transmission needs to be cooled.

Embodiment 2

Figure 2:
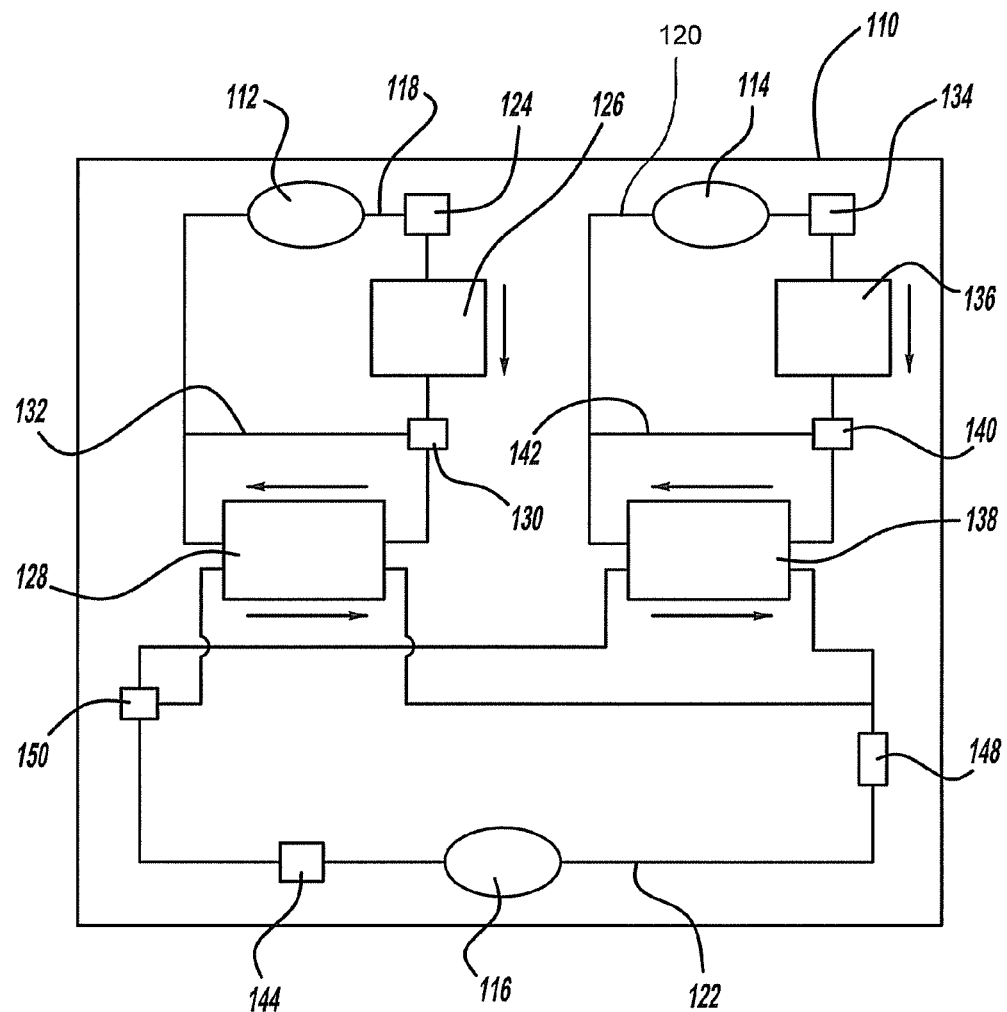
FIG. 2 is a schematic diagram of the second embodiment.

The system of the second embodiment is shown in FIG. 2. The second embodiment 2 is similar to the first embodiment, and so similar components are denoted by the same reference numerals but with a prefix "1", and only the differences will be described.

In the second embodiment, the first and second heat exchangers 128, 138 are connected in parallel, rather than in series as in the first embodiment. The transmission oil cooling subsystem 122 includes a thermostat 148 and a third flow control device 150, which controls the flow of transmission oil to the first and second heat exchangers 128, 138.

In use, when the temperature measured by the thermostat 148 is less than a threshold temperature, the third flow control device 150 controls the flow of transmission oil so that all the transmission oil flows through the first heat exchanger 128, and the first heat exchanger 128 therefore performs all the cooling on the transmission oil. If the temperature measured by the thermostat 148 exceeds the threshold temperature, for example, if the engine temperature, and therefore the temperature of the water/glycol is relatively high, the flow control device 150 controls the flow of transmission oil so that some of the transmission oil passes through the second heat exchanger 138, and the transmission oil is therefore cooled by both the first and second heat exchangers 128, 138. The proportion of the flow of transmission oil which passes through the second heat exchanger 138 is increased by the flow control device 150 until the temperature measured by the thermostat 148 falls back below the threshold temperature.

There are numerous changes which are within the scope of the present disclosure. For example, the vehicle could be a different kind of construction equipment, a telescopic handler, forklift, tracked excavator, or an agricultural vehicle such as a tractor or combine harvester.

In the second embodiment, the third flow control device could control the flow of transmission oil, so that all the transmission oil flows through the second heat exchanger when the temperature measured by the thermostat is below the threshold temperature, and allow some of the transmission oil to flow through the first heat exchanger when the threshold temperature is exceeded.

The first and second heat exchangers may be connected in series, and a thermostat included in the transmission subsystem, and, rather than control the flow in the transmission subsystem, the flow through the first and second heat exchangers of water/glycol and hydraulic oil from the engine cooling subsystem and the hydraulic cooling subsystem, respectively, could be controlled instead.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A cooling system for a vehicle, the cooling system comprising:
   a first cooling subsystem which circulates first subsystem fluid,
   an engine cooling subsystem which circulates cooling fluid, and
   a second cooling subsystem which circulates second subsystem fluid, wherein
   the first cooling subsystem includes first and second heat exchangers, the first heat exchanger being configured to allow the through-flow of the cooling fluid from the engine cooling subsystem to cool the first subsystem fluid and the second heat exchanger being configured to allow the through-flow of the second subsystem fluid from the second cooling subsystem to cool the first subsystem fluid; and
   the first subsystem fluid is different than the cooling fluid and the second subsystem fluid, and the second subsystem fluid is different than the cooling fluid.

2. The cooling system according to claim 1, wherein the cooling fluid in the engine cooling subsystem is a water/glycol mixture.

3. The cooling system according to claim 1, wherein the first heat exchanger is a parallel flow cooler.

4. The cooling system according to claim 1, wherein the second heat exchanger is a parallel flow cooler.

5. The cooling system according to claim 1, wherein the engine cooling subsystem is configured such that not more than 10% of the total flow of engine cooling fluid in the engine cooling subsystem passes through the first heat exchanger.

6. The cooling system according to claim 1, wherein the engine cooling subsystem comprises a first flow control device to control a proportion of the total flow of the cooling fluid in the engine cooling subsystem which flows through the first heat exchanger.

7. The cooling system according to claim 6, wherein the first flow control device controls the proportion of the cooling fluid in the engine cooling subsystem which flows through the first heat exchanger to between 0% to 10% of the total flow of cooling fluid in the engine cooling subsystem.

8. The cooling system according to claim 1, wherein the second cooling subsystem is configured such that not more than 10% of the total flow of second subsystem fluid in the second cooling subsystem passes through the second heat exchanger.

9. The cooling system according to claim 1, wherein the second cooling subsystem comprises a second flow control device to control a proportion of the total flow of second subsystem fluid in the second cooling subsystem which flows through the second heat exchanger.

10. The cooling system according to claim 9, wherein the second flow control device controls the proportion of the total flow of second subsystem fluid in the second cooling subsystem which flows through the second heat exchanger to between 0% to 10% of the total flow of second subsystem fluid in the second cooling subsystem.

11. The cooling system according to claim 1, wherein the second cooling subsystem includes an air-liquid heat exchanger.

12. The cooling system according to claim 9, wherein the first cooling subsystem includes a thermostat.

13. The cooling system according to claim 12, wherein, when a temperature measured by the thermostat is less than a threshold temperature, the second flow control device prevents the flow of the second subsystem fluid through the second heat exchanger.

14. The cooling system according to claim 13, wherein, when the temperature measured by the thermostat exceeds the threshold temperature, the second flow control device controls the flow of second subsystem fluid such that the total flow of second subsystem fluid through the second heat exchanger is greater than 0% of the total flow in the second cooling subsystem.

15. The cooling system according to claim 13, wherein the second flow control device controls the flow of the second subsystem fluid such that the flow of second subsystem fluid through the second heat exchanger increases as the temperature measured by the thermostat increases, once the threshold temperature has been exceeded.

16. The cooling system according to claim 12, wherein, when the temperature measured by the thermostat is less than a threshold temperature, the first control device prevents the flow of cooling fluid through the first heat exchanger.

17. The cooling system according to claim 16, wherein, when the temperature measured by the thermostat exceeds the threshold temperature, the first flow control device controls the flow of cooling fluid such that the total flow of cooling fluid through the first heat exchanger is greater than 0% of the total flow in the engine cooling subsystem.

18. The cooling system according to claim 16, wherein the first flow control device controls the flow of cooling fluid such that the flow of cooling fluid through the first heat exchanger increases as the temperature measured by the thermostat increases, once the threshold temperature has been exceeded.

19. The cooling system according to claim 1, wherein the first and second heat exchangers are connected in series.

20. The cooling system according to claim 1, wherein the first and second heat exchangers are connected in parallel.

21. The cooling system according to claim 20, wherein the first cooling subsystem includes a third flow control device to control the proportion of fluid which flows to the first and second heat exchangers.

22. The cooling system according to claim 21, wherein, when a temperature measured by a thermostat is less than a threshold temperature, the third flow control device prevents the flow of first subsystem fluid through the second heat exchanger.

23. The cooling system according to claim 21, wherein, when a temperature measured by a thermostat exceeds the threshold temperature, the third flow control device controls the flow of first subsystem fluid such that the total flow of first subsystem fluid through the second heat exchanger is greater than 0% of the total flow in the first subsystem.

24. The cooling system according to claim 22, wherein, when the temperature measured by the thermostat exceeds the threshold temperature, the third flow control device controls the flow of the first subsystem fluid such that the flow of first subsystem fluid through the second heat exchanger increases until the temperature measured by the thermostat is less than the threshold temperature.

25. The cooling system according to claim 21, wherein, when a temperature measured by a thermostat is less than a threshold temperature, the third control device prevents the flow of first subsystem fluid through the first heat exchanger.

26. The cooling system according to claim 21, wherein, when a temperature measured by a thermostat exceeds the threshold temperature, the third flow control device may control the flow of first subsystem fluid such that the total flow of first subsystem fluid through the first heat exchanger is greater than 0% of the total flow in the first subsystem.

27. The cooling system according to claim 21, wherein, when a temperature measured by a thermostat exceeds the threshold temperature, the third flow control device may control the flow of first subsystem fluid such that the flow of first subsystem fluid through the first heat exchanger increases until the temperature measured by the thermostat is less than the threshold temperature.

28. The cooling system according to claim 1, wherein the first cooling subsystem is a transmission oil cooling circuit, the first fluid being transmission oil.

29. The cooling system according to claim 1, wherein the second cooling subsystem is a hydraulic oil cooling circuit, the second fluid being hydraulic oil.

30. A system for cooling transmission oil in a vehicle, the system comprising:
    a hydraulic oil cooling circuit which circulates hydraulic oil,
    an engine cooling subsystem which circulates cooling fluid, and
    a transmission oil cooling circuit which circulates transmission oil, wherein
    the transmission oil circuit comprises first and second heat exchangers, the first heat exchanger being provided with the cooling fluid from the engine cooling subsystem to cool the transmission oil and the second heat exchanger being provided with the hydraulic oil from the hydraulic oil cooling circuit to cool the transmission oil; wherein
    the hydraulic oil is different than the cooling fluid and the transmission oil and the transmission oil is different than the cooling fluid.

31. A cooling system for a vehicle including an engine circulating transmission oil and a hydraulically operated implement circulating hydraulic oil, the system comprising:
    a transmission oil circuit for the engine;
    a hydraulic oil circuit for the implement, and
    a heat exchanger acting between the hydraulic oil circuit and the transmission oil circuit so that the hydraulic oil in the hydraulic oil circuit is arranged to cool the transmission oil in the transmission oil circuit; wherein
    the transmission oil is different than the hydraulic oil.

* * * * *